United States Patent
Jablonowski et al.

(10) Patent No.: US 6,923,024 B2
(45) Date of Patent: Aug. 2, 2005

(54) VAD MANUFACTURE OF OPTICAL FIBER PREFORMS WITH IMPROVED DEPOSITION CONTROL

(75) Inventors: Donald P. Jablonowski, Dunwoody, GA (US); Fengqing Wu, Duluth, GA (US)

(73) Assignee: Furukawa Electric North America, Norcross, GA (US)

( * ) Notice: Subject to any disclaimer, the term of this patent is extended or adjusted under 35 U.S.C. 154(b) by 437 days.

(21) Appl. No.: 10/142,466

(22) Filed: May 9, 2002

(65) Prior Publication Data

US 2003/0209038 A1 Nov. 13, 2003

(51) Int. Cl.$^7$ .................... C03B 37/07; C03B 37/018
(52) U.S. Cl. .................... 65/382; 65/414; 65/421; 65/491
(58) Field of Search ................ 65/392, 414, 421, 65/DIG. 13, 531, 415, 382, 491, 29.14, 384

(56) References Cited

U.S. PATENT DOCUMENTS

| 4,419,116 A | * | 12/1983 | Nakahara et al. | 65/378 |
| 4,731,103 A | * | 3/1988 | Mizutani et al. | 65/378 |
| 5,028,246 A | * | 7/1991 | Sarkar | 65/382 |
| 5,318,611 A | * | 6/1994 | Merritt | 65/416 |

FOREIGN PATENT DOCUMENTS

JP  59137331 A  * 8/1984  ........... C03B/37/00

OTHER PUBLICATIONS

English Abstract for JP 59137331 A; Printed Sep. 8, 2004*

* cited by examiner

Primary Examiner—Steven P. Griffin
Assistant Examiner—Lisa L Herring
(74) Attorney, Agent, or Firm—Peter V. D. Wilde

(57) ABSTRACT

The specification describes a VAD method for dynamically controlling the growth rate of both the core soot and the cladding soot in response to separate growth monitors.

11 Claims, 4 Drawing Sheets

VAD MANUFACTURE OF OPTICAL FIBER PREFORMS WITH IMPROVED DEPOSITION CONTROL

FIELD OF THE INVENTION

This invention relates to vapor axial deposition (VAD) processes for manufacturing optical fiber preforms. It relates more specifically to dynamic methods for coordinating core and cladding deposition.

BACKGROUND OF THE INVENTION

A variety of methods are known for making optical fiber preforms in the manufacture of optical fiber including, for example, Modified Chemical Vapor Deposition (MCVD), Sol-Gel, and Vapor Axial Deposition (VAD). In the VAD method soot preforms are prepared by reacting glass precursors in an oxyhydrogen flame to produce silica particles. The silica particles are deposited on a starting rod. The starting rod is slowly pulled upward while it is rotated, and the silica particles are deposited axially on the rod as it is pulled. Very large, and long, soot preforms can be fabricated. Typically the soot for the core is produced by a core torch and the soot for the cladding by a cladding torch. In this way, the composition of the glass can be varied from the center portion of the perform to the outside portion. Variation in glass composition is required for providing the refractive index difference necessary to produce light guiding in the optical fiber. After the soot is deposited, the preform is heated to consolidate the silica particles into a solid transparent glass body. Optical fiber is manufactured by drawing fiber from the consolidated preform using a conventional fiber drawing apparatus.

It has been recognized that the main functional part of an optical fiber is the core and the inner cladding. This part of the fiber carries 99+% of the optical energy. However, it typically consists of but 5% of the mass of the optical fiber. Accordingly, state of the art manufacture often makes use of an inner portion constituting core and inner clad region fabricated by soot deposition using MCVD or VAD, then overcladding the core rod with a material of less demanding properties. Consequently, the overcladding—the bulk of the preform—may be produced by less costly processing. Overcladding may entail direct deposition on the core rod, or may result from using a separate "overcladding tube". Such overcladding tubes have been produced from soot or fused quartz.

For uniform lightguiding properties in the optical fiber pulled from VAD preforms it is important that the preform dimensions are precise and uniform. This includes the diameter of the core and the diameter of the cladding, i.e. the preform cross section, as well as the overall preform diameter.

In typical VAD processes, the position of the tip, and the growth rate at the tip, determines the rate of pulling of the preform. If the tip temperature changes unexpectedly, e.g. decreases unexpectedly, the z-direction growth rate of the core increases. At the same time deposition of the cladding soot stays constant. This results in less cladding soot per z-direction increment, i.e. a thinner cladding than the process design calls for. The same risk prevails for the cladding soot. If the rate of deposition of the cladding soot increases (or decreases) unexpectedly, the displacement monitor at the tip does not detect that change. Again the cladding diameter to core diameter ratio changes without detection.

SUMMARY OF THE INVENTION

We have recognized the importance of coordinating the growth rates of the core and cladding and to maintain a constant core/cladding diameter ratio, as well as a constant overall preform diameter, during pulling. According to the invention, both the core soot growth rate and the cladding soot growth rate are monitored independently. The growth rates for the core soot and cladding soot are dynamically controlled independent of each other in response to the separate growth rate measurements. These controls may be used to maintain either core-clad diameter ratio, or core-clad diameter ratio and overall preform diameter.

DETAILED DESCRIPTION

Figure 1:
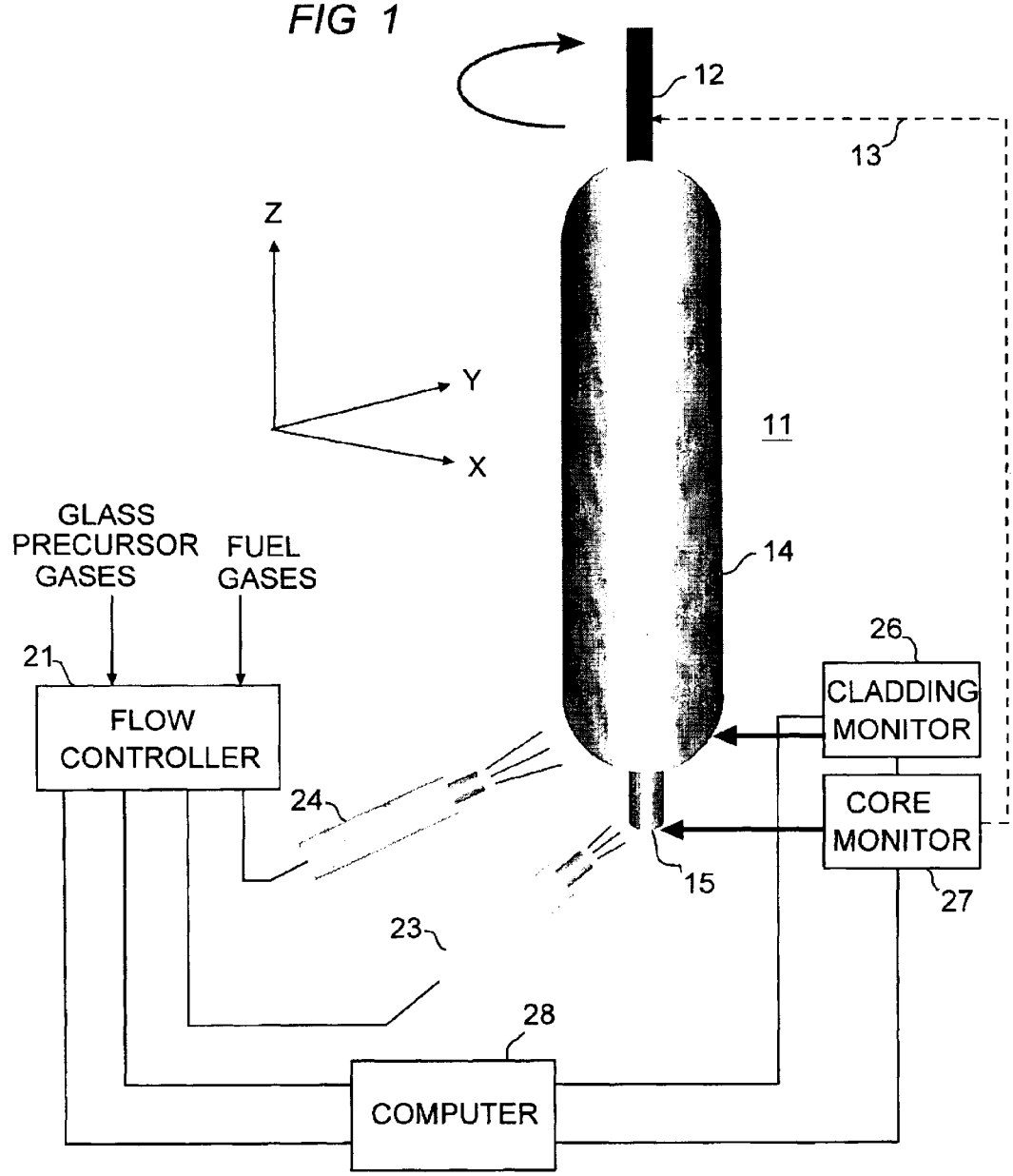
FIG. 1 is a schematic representation of an apparatus for pulling a VAD preform using the method of the invention.

With reference to FIG. 1, a schematic arrangement for pulling a soot preform is shown. The preform, shown generally at 11, is formed around a support rod 12. The rod is rotated during pulling as indicated by the arrow. The rotation minimizes x-y variations in the preform composition. The x-, y-, and z-axes are shown to the left of the preform. The preform comprises a cladding portion 14, and a core portion 15. The cladding is typically pure silica, or lightly doped silica. The core is typically silica, doped with germania. These combine to produce a preform with a refractive index difference between the core and the cladding. As is well known, the core and cladding may be made with a wide variety of compositions to produce many types of index profiles. For example, the core may be undoped and the cladding down-doped. More than one cladding layer may be made. However, in the most typical embodiment, the core is doped with germanium and the cladding is either undoped or doped with a lower concentration of germanium. Other dopants, such as phosphorus and fluorine may also be used. The main aspect of the invention, i.e. independent control of the cladding soot and core soot in response to independent measurement of clad and core growth rates is applicable to any of these preform designs and compositions.

Deposition of core soot is produced by torch 23 and deposition of cladding soot by torch 24. The torches are oxy-hydrogen torches with a flame fed by oxygen and hydrogen to control the temperature of the reaction zones in a known fashion. The flow controller and the two torch assemblies also provides the supply of glass precursor gases to the reaction zones. The glass precursor gases typically comprise $SiCl_4$ and $GeCl_4$ in an inert carrier gas. The precursor gas may be only $SiCl_4$ if the preform profile calls for a pure silica core, or pure silica cladding. In a conventional VAD apparatus, the supply of precursor gases and fuel gases to the torches 23 and 24 is set according to the process specification. The pull rate is adjusted, according to variations detected at the tip location, by a core growth rate monitor similar to that shown at 27, but with the signal from the core growth rate monitor used, as indicated by feed-back loop 13 in FIG. 1, to adjust the pull rate.

The process variations mentioned earlier may result from temperature variations in either or both of the soot reactions zones shown. When the reaction temperature changes, the soot deposition rate changes and the growth rate changes. If these changes are differential, i.e. one changes and the other doesn't, or both change but by different amounts, the core diameter to cladding diameter ratio will change. In most cases, as a result of either or both, the overall preform diameter will change.

To implement the invention, the growth rates produced by the core soot and the cladding soot are independently monitored by cladding monitor 26, and core monitor 27, respectively. Any change in either is fed back to computer 28, which computes the control action sent to flow controlling unit 21. As just described, the flow controlling unit controls the flow of glass precursor gases to the reaction zones of both the core soot and the cladding soot, and controls the temperature of both reactions by controlling the flow of fuel gases to the torches 23 and 24. In the arrangement shown, control of the core soot and cladding soot reactions is independent, and may be implemented by controlling the flow rate of the precursor gases, the fuel gases, or both.

Figure 2:
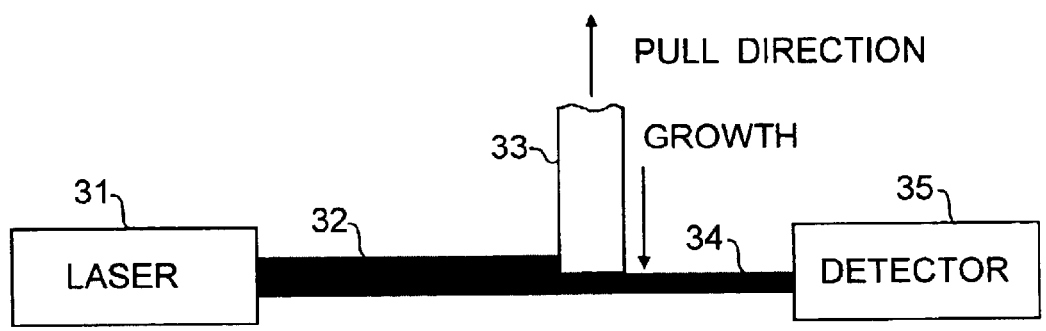
FIG. 2 is a schematic diagram showing a beam extinction method for monitoring soot deposition rate.

In one embodiment the growth rate of soot in the reaction zones is monitored using a laser beam extinction method. This is illustrated in FIG. 2, where monitoring laser 31 produces a beam 32 which is incident on the end of the core reaction zone where the core soot 33 is deposited. The beam is arranged so that it is partially obscured by the soot as it grows in the z-direction. The portion 34 of the laser beam that is not obscured passes to detector 35. Detector 35 controls the rate of pulling in the z-direction by maintaining a constant power level in beam 34. The extinction ratio can be set at any desired value. Assuming a circular laser beam, the power level variation with z-direction displacement is most sensitive if the extinction is near maximum or minimum. However, beam alignment is most reliable if the extinction ratio is near 50%, for example, 35%–65%.

Figure 3:
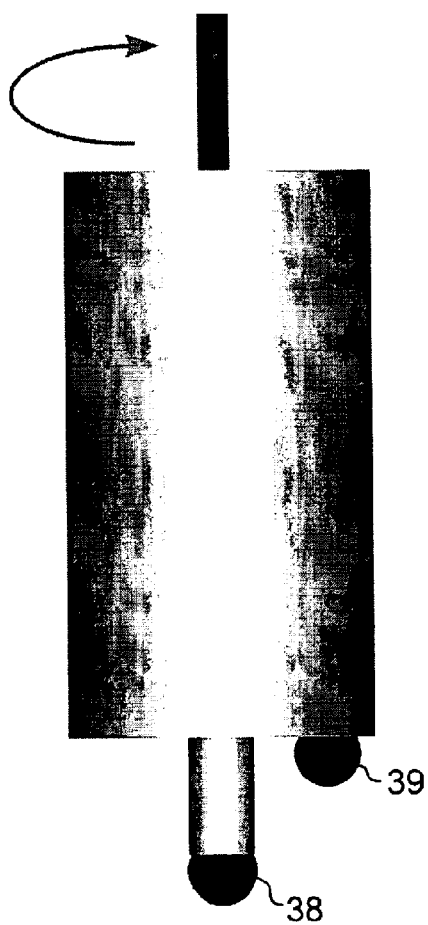
FIG. 3 is a schematic representation of a VAD preform pulling apparatus showing implementation of the invention using independent monitoring beams.

A beam extinction displacement monitoring system suitable for the invention is illustrated in FIG. 3. The monitoring beams, 38 and 39 for the core reaction zone and the cladding reaction zone, respectively, are shown, with the beam direction extending toward the viewer. Other axes may be chosen.

Growth rate variations between core soot and cladding soot may occur in several combinations. These are given in the following table.

| COMB>>> | 1 | 2 | 3 | 4 | 5 | 6 |
|---|---|---|---|---|---|---|
| CORE | + | 0 | − | 0 | − | + |
| CLADDING | 0 | + | 0 | − | − | + |

The plus and minus signs represent the output of the photodetectors in the system illustrated in FIGS. 1 and 2. A positive output, i.e. a positive departure from the nominal beam extinction value, means the growth rate has declined below the rate indicated by the process design. A minus output means that the growth rate exceeds the process design rate.

In a typical VAD process, the pull rate of the preform is normalized to the growth rate of the core. A z-direction spatial monitor is used as the primary control mechanism. In principle, this automatically accounts for variations in the core growth rate. However, since the cladding growth rate is not separately monitored, the actual core/clad diameter ratio is left uncontrolled, and there is no precise control of the overall preform diameter. Considering the variations represented in the table above, combination 1, left uncorrected, will produce a preform that has a core/clad diameter ratio that is less than desired, and an overall preform diameter larger than desired. This results from a reduction in pull rate, responding to the core monitor, without a change in the cladding growth rate. Combination 2, with no change in the pull rate, will produce a higher than desired core/clad diameter ratio, and also a reduced overall diameter. Combination 3, will produce a preform that has a core/clad diameter ratio that is larger than desired, and an overall preform diameter smaller than desired. Combination 4, with no change in the pull rate, will produce excessive cladding, and a lower than desired core/clad ratio, and a preform larger than desired. Combinations 5 and 6 may be acceptable depending on the how closely the magnitude of the changes match. However, in most cases the values will not match, with consequent deviations in preform dimensions from the design values.

Figure 4:
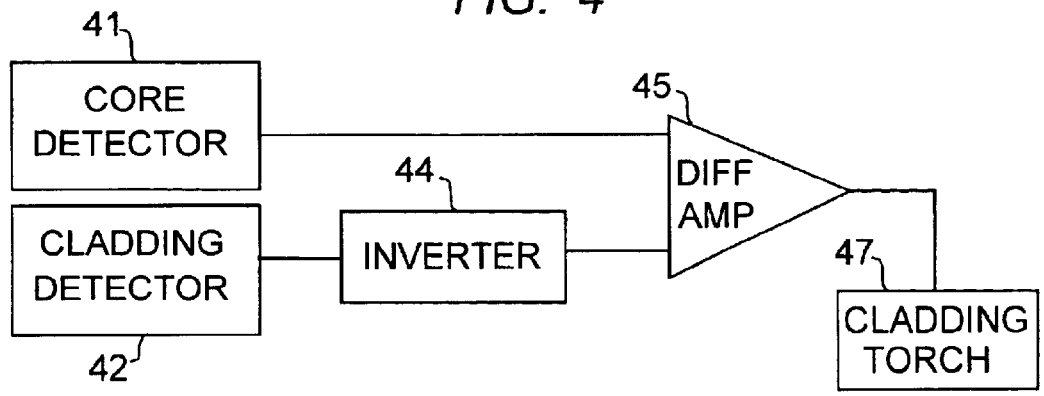
FIG. 4 is a control circuit for maintaining constant core-clad diameter ratio.

A control system is shown in FIG. 4 for overcoming the problems just discussed. In this arrangement, one or the other of the detector signals 41, 42 (shown here as the cladding detector signal 42) is inverted by inverter 44 and the signals are summed by differential amplifier 45. The difference signal is used to adjust the cladding torch 47. This system is simple, and effectively controls the core/clad diameter ratio. It assumes that the core growth rate is relatively well controlled, since the core/clad diameter ratio is normalized on the core growth rate. The core growth rate may be controlled effectively using the invention described and claimed in co-pending application Ser. No. 10/131,700, filed Apr. 24, 2002).

In the arrangement shown in FIG. 4, the differential in growth rates is controlled by adjusting the cladding soot deposition. A similar result can be obtained wherein the summed signal from amplifier 45 is used to control the core soot deposition.

According to a somewhat simpler embodiment of the invention, if the core growth rate is well controlled, it is only necessary to monitor and adjust the cladding growth rate. In this embodiment, the core growth monitor is used to control the pull rate (as shown in FIG. 1), with the cladding deposition conditions adjusted to maintain the desired differential growth rates.

Figure 5:
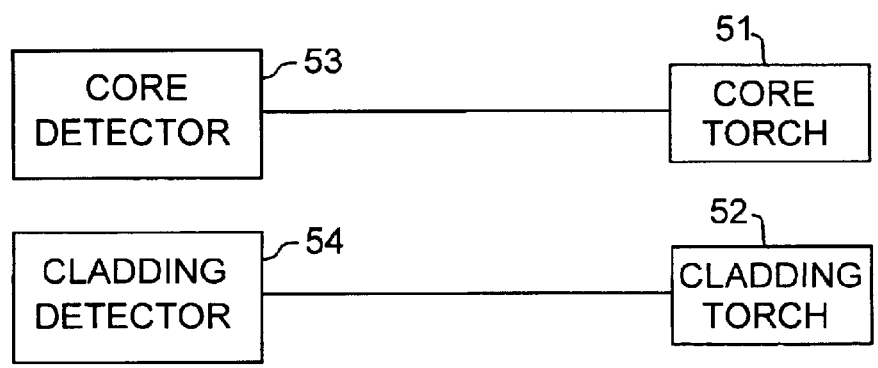
FIG. 5 is a control arrangement for completely independent control of core and cladding growth rates.

A preferred control system is shown in FIG. 5. In this system both torches 51, 52 are independently controlled by the separate core and cladding detector signals 53, 54. This system maintains effective control of the core/clad diameter ratio, as well as the overall preform diameter. The system is, within reasonable limits, independent of variations in the pull rate. It approaches the ideal system, wherein the pull rate is fixed, and the growth rates of both the core and cladding are independently controlled to produce any desired effect.

As a general proposition, maintaining a constant growth rate for both the core and cladding is desirable. A constant growth rate helps maintain a uniform soot density. The system of FIG. 4 is designed to account for variations in growth rates of the core or cladding, or both. However, the system of FIG. 5 can maintain both growth rates constant. This allows the pull rate to remain fixed, and the growth rates to remain fixed.

The ability to independently control the growth rates of core and cladding leads to new processing options. For example, optical fibers with deliberate longitudinal variations in profile have been proposed. These include fibers with peristaltic index profiles for enhancing mode mixing. The control features of the invention allow these types of fibers to be produced using VAD processes.

The following examples are provided to demonstrate the invention.

EXAMPLE 1

A soot preform is prepared using the dual torch arrangement shown in FIG. 1. The soot preform is pulled at a rate that typically varies over the range 40–100 mm/hr. The pulling speed is automatically adjusted according to the growth rate of soot at the tip of the preform. The pulling speed is obtained by measuring the z-axis displacement of the pulling rod 12 in FIG. 1. The flow rate for $SiCl_4$ is 150 cc/min and the flow rate for $GeCl_4$ is 15 cc/min. Flow rates of the gases supplied to the torch 23 and 24 vary depending on the design of the apparatus used. Therefore these, and other, suitable values are given by way of example only. The temperatures recorded at the tip typically varies from 500–800° C. depending on the process conditions. In this example, the growth rate of core soot is controlled by monitoring the tip temperature and adjusting the fuel gas mixture, either composition or flow rate, of the core soot torch. The pull rate is controlled by the photodetector associated with the core growth rate monitor. The growth rate of the cladding soot is controlled independently by the cladding growth rate monitor.

EXAMPLE 2

The same general method described in Example 1 was followed except that the signal from the cladding beam is summed with an inverted signal from the core beam and the summed signal is used to adjust the cladding soot torch.

EXAMPLE 3

The same general method described in the examples above is used except that in this example the pull rate is fixed and the control system of FIG. 5 is used to control the core growth rate and the cladding growth rate independently.

The result in each of the examples is improved control over the preform profile.

After deposition of the soot and formation of the porous soot preform, the porous body is then consolidated by heating to a temperature sufficient to melt the silica particles into a solid, dense, glass preform. Consolidation is typically performed by heating the soot body to a temperature of 1400° C. to 1600° C. The solid preform is then ready for mounting in a fiber draw apparatus and drawing optical fiber, which will be discussed below.

Figure 6:
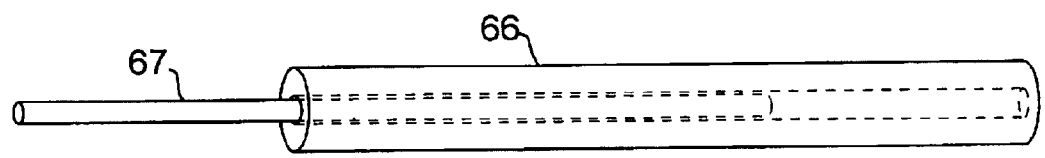
FIGS. 6 and 7 are schematic representations of a rod and tube process for making a preform using a VAD core rod.
Figure 7:
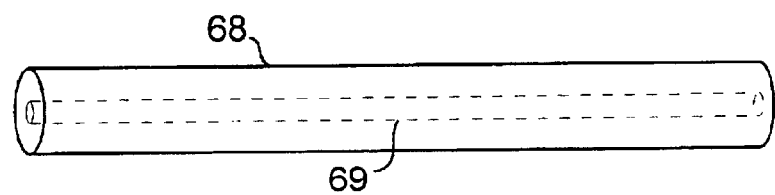

The examples described are useful for producing a variety of types of preforms. However, the most demanding aspect of preform manufacture involves the formation of the core and the primary cladding. This is the region where composition changes are most critical, and control of the reaction temperature requires the most precision. As indicated earlier, outside cladding may be made using other, less expensive, techniques. Accordingly a preferred embodiment of this invention is the use of a rod-in-tube process. A typical rod-in-tube approach is shown in FIGS. 6 and 7. The drawing is not to scale. The cladding tube is shown in FIGS. 6 and 7 at 66. A typical length to diameter ratio is 10–15. The core rod 67 is shown being inserted into the cladding tube. The rod at this point is typically already consolidated. In an alternative overcladding method cladding soot is deposited on top of a core rod. As mentioned above, there exist several common options for the composition of the core rod. It may be pure silica, with a down-doped cladding. It may have a pure silica center region with a down doped outer core region. It may have an up-doped, e.g. germania doped, center core region surrounded by a pure silica region. It may have an up-doped center core region surrounded by a down doped outer core region. All of these options are well known in the art and require no further exposition here. After assembly of the rod 67 and tube 66, the combination is sintered to produce the final preform 68 shown in FIG. 7, with the core 69 indistinguishable from the cladding except for a small refractive index difference.

Typical dimensions of the rod and cladding tube are also well known. The diameter of a consolidated cladding tube for a standard multi-mode fiber is approximately twice the diameter of the core rod. In the case of a preform for a single mode fiber the diameter of the rod is approximately 5% of the final diameter of the cladding tube.

Figure 8:
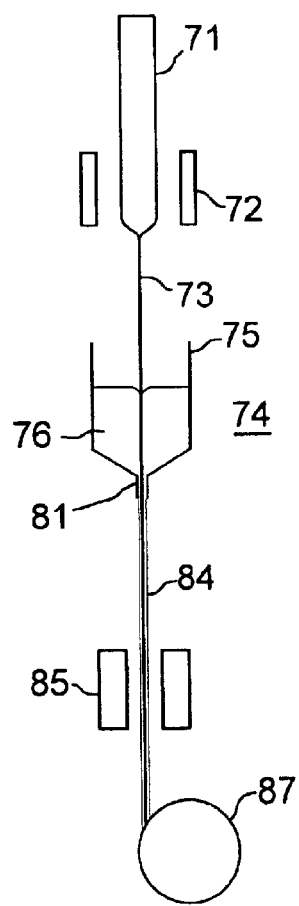
FIG. 8 is a schematic representation of a fiber drawing apparatus useful for drawing preforms, made by the invention, into continuous lengths of optical fiber.

The completed preform is then used for drawing optical fiber in the conventional way. FIG. 8 shows an optical fiber drawing apparatus with preform 71 and susceptor 72 representing the furnace (not shown) used to soften the glass preform and initiate fiber draw. The drawn fiber is shown at 73. The nascent fiber surface is then passed through a coating cup, indicated generally at 74, which has chamber 75 containing a coating prepolymer 76. The liquid coated fiber from the coating chamber exits through die 81. The combination of die 81 and the fluid dynamics of the prepolymer, controls the coating thickness. The prepolymer coated fiber 84 is then exposed to UV lamps 85 to cure the prepolymer and complete the coating process. Other curing radiation may be used where appropriate. The fiber, with the coating cured, is then taken up by take-up reel 87. The take-up reel controls the draw speed of the fiber. Draw speeds in the range typically of 1–20 m/sec. can be used. It is important that the fiber be centered within the coating cup, and particularly within the exit die 81, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus in FIG. 8 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 $\mu$m in diameter, with approximately 240 $\mu$m standard.

Reference herein to silica preforms means highly pure silica bodies. The silica base material for optical fiber preforms necessarily excludes impurities such as water or iron. They may however, include small amounts of dopants, such as fluorine, for modifying refractive index. Typical optical fiber is more than 85% silica by weight.

Reference to pulling the support rod 12 of FIG. 1 is meant to include any arrangement wherein the position of the preform is controllably moved in relation to the position of torches 23 and 24.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. Process for the manufacture of a preform of silica particles the soot preform having a core region and a cladding region comprising:
   (a) pulling a support rod;
   (b) simultaneously depositing core soot on the support rod and cladding soot on the core soot, wherein the core soot is deposited by:
      (i) forming core soot by flowing together: a flow of glass precursor gases, a flow of hydrogen, and a flow of oxygen, to form a first gas mixture, igniting the first gas mixture to form core soot,
      (ii) depositing the core soot on the support rod to form the core region of the preform,
      (iii) continuously monitoring the rate of deposition of soot in the core region to produce a core monitor signal, and the cladding soot is deposited by:
      (iv) forming cladding soot by flowing together: a flow of glass precursor gases, a flow of hydrogen, and a flow of oxygen, to form a second gas mixture, igniting the second gas mixture to form cladding soot,
      (v) depositing the cladding soot onto the core soot to form the cladding region of the preform,
      (vi) continuously monitoring the rate of deposition of soot in the cladding region to produce a cladding monitor signal.

2. The process of claim 1 wherein the glass precursor gases in the first gas mixture comprise $SiCl_4$ and $GeCl_4$.

3. The process of claim 2 wherein the second gas mixture comprises $SiCl_4$, hydrogen and oxygen.

4. The process of claim 1 wherein movement of the support rod is controlled by the core monitor signal.

5. The process of claim 1 wherein the second gas mixture is adjusted in response to the cladding monitor signal.

6. The process of claim 1 wherein the second gas mixture is adjusted in response to the sum of the core monitor signal and the cladding monitor signal.

7. The process of claim 1 wherein the first gas mixture is adjusted in response to the core monitor signal and the second gas mixture is adjusted in response to the cladding monitor signal.

8. The process of claim 1 wherein the rate of deposition of soot in the core region and the rate of deposition of soot in the cladding region are both monitored using a laser beam.

9. The process of claim 1 further including heating the soot preform to consolidate the soot into a solid glass preform.

10. The process of claim 1 wherein step (a) is controlled by both step (iii) and step (vi).

11. Process for the manufacture of optical fibers comprising:
   (a) preparing a preform, the preform having a core region and a cladding region comprising pulling a support rod and simultaneously depositing core soot on the support rod and cladding soot on the core soot, wherein the core soot is deposited by:
      (i) forming core soot by flowing together: a flow of glass precursor gases, a flow of hydrogen, and a flow of oxygen, to form a first gas mixture, igniting the first gas mixture to form core soot,
      (ii) depositing core soot onto the support rod to form the core region of the preform,
      (iii) continuously monitoring the rate of deposition of soot in the core region to produce a core monitor signal,
      (iv) forming cladding soot by flowing together: a flow of glass precursor gases, a flow of hydrogen, and a flow of oxygen, to form a second gas mixture, igniting the second gas mixture to form cladding soot,
      (v) depositing the cladding soot onto the core soot to form the cladding region of the preform,
      (vi) continuously monitoring the rate of deposition of soot in the cladding region to produce a cladding monitor signal,
      (vii) heating the preform to consolidate the preform into solid glass,
   (b) mounting the preform in an optical fiber drawing apparatus,
   (c) heating the preform to soften the glass, and
   (d) drawing an optical fiber from the preform.

* * * * *